(12) United States Patent
Huang (10) Patent No.: US 9,897,833 B2
(45) Date of Patent: Feb. 20, 2018

(54) ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventor: Shishuai Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 289 days.

(21) Appl. No.: 14/426,144

(22) PCT Filed: Oct. 17, 2014

(86) PCT No.: PCT/CN2014/088840
§ 371 (c)(1),
(2) Date: Mar. 4, 2015

(87) PCT Pub. No.: WO2016/058183
PCT Pub. Date: Apr. 21, 2016

(65) Prior Publication Data
US 2016/0246092 A1    Aug. 25, 2016

(30) Foreign Application Priority Data
Oct. 14, 2014 (CN) .......................... 2014 1 0542914

(51) Int. Cl.
*G02F 1/133* (2006.01)
*G02F 1/1368* (2006.01)
(Continued)

(52) U.S. Cl.
CPC ........ *G02F 1/13306* (2013.01); *G02F 1/1368* (2013.01); *G02F 1/13624* (2013.01);
(Continued)

(58) Field of Classification Search
CPC ............ G02F 1/136213; G02F 1/1368; G02F 1/134309
(Continued)

(56) References Cited

U.S. PATENT DOCUMENTS 5,767,659 A * 6/1998 Farley .................. H01M 10/46
320/106
2003/0058377 A1* 3/2003 Chae ................. G02F 1/136213
349/43
(Continued)

FOREIGN PATENT DOCUMENTS

CN    101135785 A    3/2008
CN    101169531 A    4/2008
(Continued)

*Primary Examiner* — Carolyn R Edwards
(74) *Attorney, Agent, or Firm* — Andrew C. Cheng (57) ABSTRACT

The present invention provides an array substrate and a liquid crystal display panel. The array substrate includes a pixel unit, and a drive circuit and a control circuit corresponding to the pixel unit. The pixel unit includes a first pixel electrode and a second pixel electrode. The drive circuit is for inputting a display signal to the pixel unit. The control circuit is for charging a potential on the first pixel electrode or the second pixel electrode and thereby making the first pixel electrode and the second pixel electrode to have a voltage difference therebetween. The control circuit is disposed inn a vertical projection region on the array substrate of an opaque region. By using the above solution, the present invention can reduce color shift and increase aperture ratio.

16 Claims, 4 Drawing Sheets

(51) Int. Cl.
*G02F 1/1335* (2006.01)
*G02F 1/1362* (2006.01)
*G02F 1/1343* (2006.01)

(52) U.S. Cl.
CPC .. *G02F 1/133512* (2013.01); *G02F 1/133514* (2013.01); *G02F 1/136213* (2013.01); *G02F 1/136286* (2013.01); G02F 1/134309 (2013.01)

(58) Field of Classification Search
USPC .......................................................... 345/204
See application file for complete search history.

(56) References Cited

U.S. PATENT DOCUMENTS

| | | | | |
|---|---|---|---|---|
| 2004/0246821 | A1* | 12/2004 | Fujisawa | G04G 19/08 368/204 |
| 2005/0243230 | A1* | 11/2005 | Chen | G02F 1/1362 349/43 |
| 2008/0204392 | A1* | 8/2008 | Han | G09G 3/3614 345/92 |
| 2012/0033160 | A1* | 2/2012 | Tashiro | G02F 1/133707 349/103 |
| 2012/0299119 | A1* | 11/2012 | Xue | H01L 23/49524 257/401 |
| 2015/0364063 | A1* | 12/2015 | West | B43L 1/008 428/41.8 |

FOREIGN PATENT DOCUMENTS

| CN | 101699339 A | 4/2010 |
|---|---|---|
| CN | 102081269 A | 6/2016 |

\* cited by examiner

ARRAY SUBSTRATE AND LIQUID CRYSTAL DISPLAY PANEL

TECHNICAL FIELD

The present invention relates to the field of liquid crystal display technology, and particularly to an array substrate and a liquid crystal display panel.

DESCRIPTION OF RELATED ART

The liquid crystal display panel generally has the issue of color shift, and especially the large-sized liquid crystal display panel has a more serious color shift. The larger the viewing angle is, the more obvious the color shift is.

Figure 1:
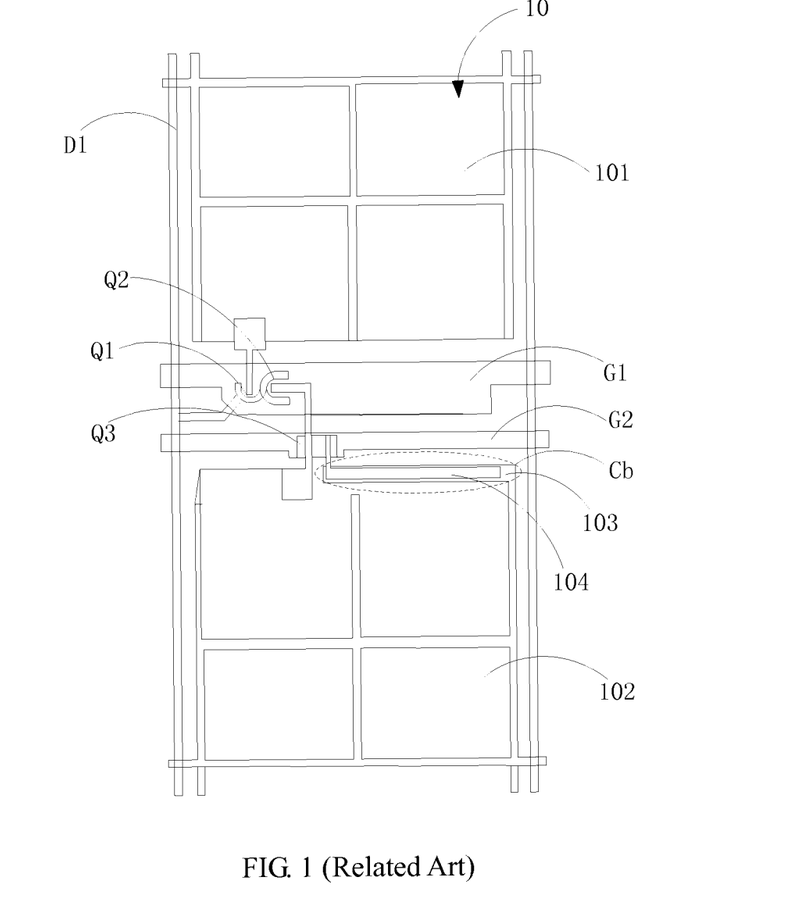
FIG. 1 is a schematic view of a pixel structure of a liquid crystal display panel in the related art.
Figure 2:
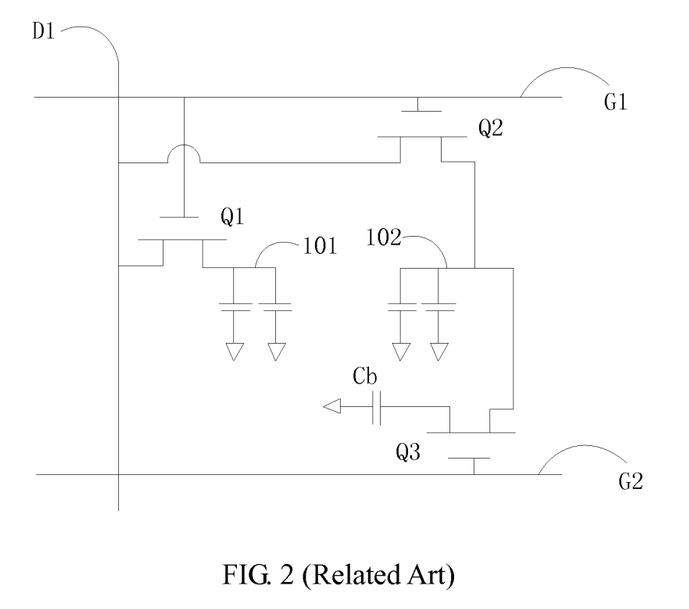
FIG. 2 is an equivalent circuit diagram of the pixel structure shown in FIG. 1.

In order to increase the viewing angle but reduce the color shift, the liquid crystal display panel generally is given a low color shift design. As shown in FIGS. 1 and 2, in a liquid crystal display panel, each pixel unit 10 generally is divided into two parts, i.e., main pixel electrode 101 and sub pixel electrode 102. A thin film transistor Q1 is electrically connected with the main pixel electrode 101, and a thin film transistor Q2 is electrically connected with the sub pixel electrode 102. When a scan line G1 is inputted with a scan signal to control the thin film transistors Q1, Q2 to be ON-states, a data line D1 input a display signal to the main pixel electrode 101 and the sub pixel electrode 102. In order to achieve the purpose of reducing color shift, the structure of pixel unit further is formed with a sharing capacitor Cb. The sharing capacitor Cb is electrically with the sub pixel electrode 102 through a thin film transistor Q3, and a scan line G2 is electrically connected with the thin film transistor Q3 to control ON-OFF states of the thin film transistor Q3. After the data line D1 charges (i.e., input a display signal) the main pixel electrode 101 and the sub pixel electrode 102, the main pixel electrode 101 and the sub pixel electrode 102 have a same potential. Afterwards, the thin film transistor Q3 is controlled to be ON-state, and at this time the sharing capacitor Cb is electrically communicated with the sub pixel electrode 102, some charges of the sub pixel electrode 102 is discharged to the sharing capacitor Cb, so that the main pixel electrode 101 and the sub pixel electrode 102 are made to have a potential difference (voltage difference) therebetween, and the purpose of reducing color shift can be achieved.

Although the above pixel structure can achieve low color shift, however, as shown in FIG. 1, the sharing capacitor Cb is formed by a common electrode layer 103 and a metal layer 104 of forming a drain of the thin film transistor Q3, and the common electrode layer 103 generally is located at a light-transmissive region of pixel electrodes allowing light to be transmitted for display, and therefore the sharing capacitor Cb would occupy some of the pixel electrode region, resulting in the decrease of aperture ratio.

SUMMARY

Accordingly, a technical problem primarily is solved by the present invention is to provide an array substrate and a liquid crystal display panel, so as to increase aperture ratio while reducing color shift.

In order to solve the above technical problem, a technical solution proposed by the present invention is to provide an array substrate. The array substrate includes a pixel unit, and a drive circuit and a control circuit corresponding to the pixel unit. The pixel unit includes a first pixel electrode and a second pixel electrode. The first pixel electrode and the second pixel electrode both are fishbone shaped electrodes. The drive circuit includes a first switch, a second switch, a data line and a first scan line. The first scan line is configured (i.e., structured and arranged) for controlling ON-OFF states of the first switch and the second switch. When the first switch and the second switch are controlled to be ON-states, the data line inputs a display signal to the first pixel electrode and the second pixel electrode through the first switch and the second switch at the ON-states respectively. The control circuit comprises a second scan line, a third switch and a capacitor. The capacitor is disposed in a vertical projection region on the array substrate of an opaque region. The second scan line is configured for controlling ON-OFF states of the third switch. The capacitor is electrically connected with the second pixel electrode through the third switch and for changing a voltage on the second pixel electrode when the third switch is controlled to be ON-state and thereby making the first pixel electrode and the second pixel electrode to have a present voltage difference.

In an exemplary embodiment, the first switch, the second switch and the third switch each are a thin film transistor. The capacitor includes a first electrode plate and a second electrode plate. A metal layer of forming the first electrode plate and a metal layer of forming a drain of the third switch are the same one metal layer. The second electrode plate is a metal layer of forming the first scan line.

In an exemplary embodiment, the first pixel electrode and the second pixel electrode are sequentially arranged along the lengthwise direction of the data line. The control circuit and some of the drive circuit are disposed between the first pixel electrode and the second pixel electrode.

In order to solve the above technical problem, another technical solution proposed by the present invention is to provide an array substrate. The array substrate includes a pixel unit, a drive circuit and a control circuit corresponding to the pixel unit. The pixel unit includes a first pixel electrode and a second pixel electrode. The drive circuit is electrically connected with the first pixel electrode and the second pixel electrode and for inputting a display signal to the first pixel electrode and the second pixel electrode. The control circuit is electrically connected with one of the first pixel electrode and the second pixel electrode and for controlling the first pixel electrode and the second pixel electrode to have a preset voltage difference therebetween. The control circuit is disposed in a vertical projection region on the array substrate of an opaque region.

In an exemplary embodiment, the drive circuit includes a first switch, a second switch, a data line and a first scan line. The first scan line is configured for controlling ON-OFF states of the first switch and the second switch. When the first switch and the second switch are controlled to be ON-states, the data line is configured for inputting the display signal to the first pixel electrode and the second pixel electrode through the first switch and the second switch at the ON-states respectively. The control circuit includes a second scan line, a third switch and a capacitor. The capacitor is disposed in the vertical projection region of the opaque region. The second scan line is configured for controlling ON-OFF states of the third switch. The capacitor is electrically connected with the second pixel electrode through the third switch and for changing a voltage on the second pixel electrode when the third switch is controlled to be ON-state and thereby making the first pixel electrode and the second pixel electrode to have the preset voltage difference.

In an exemplary embodiment, the first switch, the second switch and the third switch all are thin film transistors. The capacitor includes a first electrode plate and a second electrode plate. A metal layer of forming the first electrode plate and a metal layer of forming a drain of the third switch are the same one metal layer, and the second electrode layer is a metal layer of forming the first scan line.

In an exemplary embodiment, the first pixel electrode and the second pixel electrode are sequentially arranged along the lengthwise direction of the data line. The control circuit and some of the drive circuit are disposed between the first pixel electrode and the second pixel electrode.

In an exemplary embodiment, the drive circuit includes a first switch, a second switch, a data line and a first scan line. The first scan line is configured for controlling ON-OFF states of the first switch and the second switch. When the first switch and the second switch are controlled to be ON-states, the data line is configured for inputting the display signal to the first pixel electrode and the second pixel electrode through the first switch and the second switch at the ON-states respectively. The control circuit includes a third switch and a capacitor. The capacitor is disposed in the vertical projection region of the opaque region and between neighboring two pixel units. The third switch is electrically connected with a first scan line of a drive circuit corresponding to a neighboring next pixel unit and ON-OFF states of the third switch are subjected to the control of the first scan line of the drive circuit corresponding to the neighboring next pixel unit. The capacitor is electrically connected with the second pixel electrode through the third switch and for changing a voltage on the second pixel electrode when the third switch is controlled to be ON-state and thereby making the first pixel electrode and the second pixel electrode to have the preset voltage difference therebetween.

In an exemplary embodiment, the first pixel electrode and the second pixel electrode are sequentially arranged along the lengthwise direction of the first scan line. The control circuit and some of the drive circuit are disposed between neighboring two pixel units.

In order to solve the above technical problem, still another solution proposed by the present invention is to provide a liquid crystal display panel. The liquid crystal display panel includes an array substrate, a color filter substrate and a liquid crystal layer disposed between the array substrate and the color filter substrate. The color filter substrate includes an opaque region. The array substrate includes a pixel unit, a drive circuit and a control circuit corresponding to the pixel unit. The pixel unit includes a first pixel electrode and a second pixel electrode. The drive circuit is electrically connected the first pixel electrode and the second pixel electrode and for inputting a display signal to the first pixel electrode and the second pixel electrode. The control circuit is electrically connected with one of the first pixel electrode and the second pixel electrode and for controlling the first pixel electrode and the second pixel electrode to have a preset voltage difference therebetween. The control circuit is disposed in a vertical projection region on the array substrate of the opaque region.

In an exemplary embodiment, the drive circuit includes a first switch, a second switch, a data line and a first scan line. The first scan line is configured for controlling ON-OFF states of the first switch and the second switch. When the first switch and the second switch are controlled to be ON-states, the data line is configured for inputting the display signal to the first pixel electrode and the second pixel electrode through the first switch and the second switch at the ON-states respectively. The control circuit includes a second scan line, a third switch and a capacitor. The capacitor is disposed in the vertical projection region of the opaque region. The second scan line is configured for controlling ON-OFF states of the third switch. The capacitor is electrically connected with the second pixel electrode through the third switch and for changing a voltage on the second pixel electrode when the third switch is controlled to be ON-state and thereby making the first pixel electrode and the second pixel electrode to have the preset voltage difference therebetween.

In an exemplary embodiment, the first switch, the second switch and the third switch all are thin film transistors. The capacitor includes a first electrode plate and a second electrode plate. A metal layer of forming the first electrode plate and a metal layer of forming a drain of the third switch are the same one metal layer, and the second electrode plate is a metal layer of forming the first scan line.

In an exemplary embodiment, the first pixel electrode and the second pixel electrode are sequentially arranged along the lengthwise direction of the data line. The control circuit and some of the drive circuit are disposed between the first pixel electrode and the second pixel electrode.

In an exemplary embodiment, the drive circuit includes a first switch, a second switch, a data line and a first scan line. The first scan line is for controlling ON-OFF states of the first switch and the second switch. When the first switch and the second switch are controlled to be ON-states, the data line is configured for inputting the display signal to the first pixel electrode and the second pixel electrode respectively through the first switch and the second switch are the ON-states. The control circuit includes a third switch and a capacitor. The capacitor is disposed in the vertical projection region f the opaque region and between neighboring two pixel units. The third switch is electrically connected with a first scan line of a drive circuit corresponding to a neighboring next pixel unit and ON-OFF states of the third switch are subjected to the control of the first scan line of the drive circuit corresponding to the neighboring next pixel unit. The capacitor is electrically connected with the second pixel electrode through the third switch and for changing a voltage on the second pixel electrode when the third switch is controlled to be ON-state and thereby making the first pixel electrode and the second pixel electrode to have the preset voltage difference therebetween.

In an exemplary embodiment, the first pixel electrode and the second pixel electrode are sequentially arranged along the lengthwise direction of the first scan line. The control circuit and some of the drive circuit are disposed between neighboring two pixel units.

Beneficial effects can be achieved by the present invention are that: compared with the prior art, in the array substrate of the present invention, the first pixel electrode and the second pixel electrode are made to have a preset voltage difference therebetween under the effect of the control circuit, and therefore the effect of reducing color shift can be achieved. Moreover, the control circuit is disposed in the vertical projection region on the array substrate of the opaque region of counter substrate (e.g., color filter substrate), which does not occupy the region the pixel electrodes located at, and therefore the aperture ratio can be increased

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the present invention, technical solutions in the embodiments of the present invention will be clearly and completely described. Apparently, the embodiments of the present invention described below only are a part of embodiments of the present invention, but not all embodiments. Based on the described embodiments of the present invention, all other embodiments obtained by ordinary skill in the art without creative effort belong to the scope of protection of the present invention.

Figure 3:
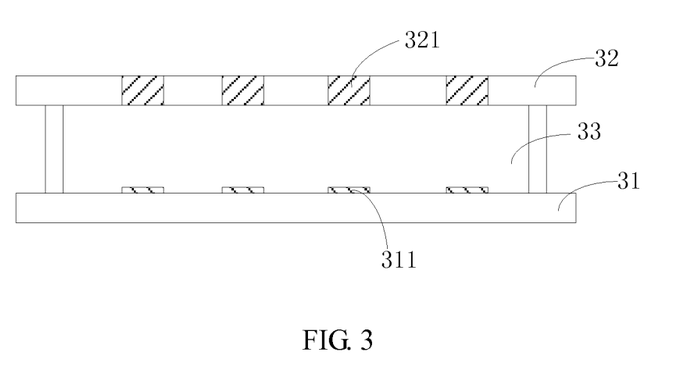
FIG. 3 is a schematic structural view of an embodiment of a liquid crystal display panel according to the present invention.

Referring to FIG. 3, in an embodiment of a liquid crystal display panel according to the present invention, liquid crystal display panel includes an array substrate 31, a color filter substrate 32 and a liquid crystal layer 33 arranged between the array substrate 31 and the color filter substrate 32. The color filter substrate 32 as a counter substrate of the array substrate 3 includes an opaque region 321, and the opaque region 321 is a region where a black matrix (BM) is located. The array substrate 31 includes a vertical projection region 311 of the opaque region 321 on the array substrate 31, i.e., the vertical projection region 311 is corresponding to a region of the opaque region 321 vertically projected on the array substrate 31.

Figure 4:
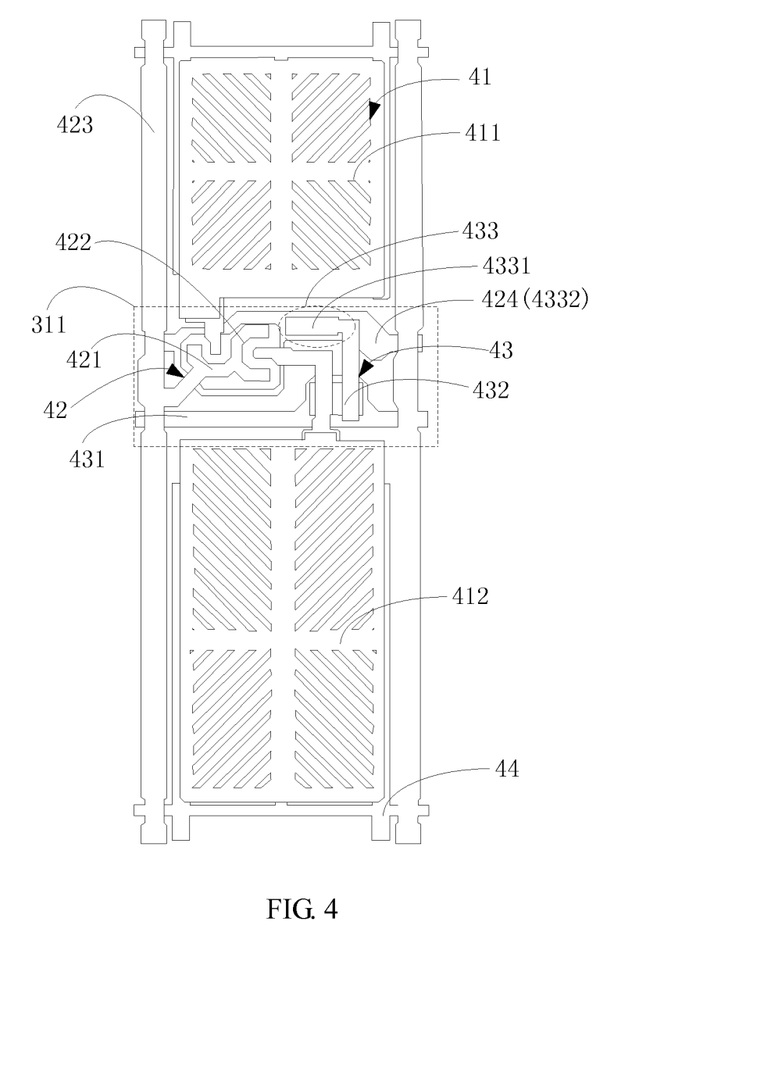
FIG. 4 is a schematic structural view of an embodiment of an array substrate shown in FIG. 3.

Referring to FIG. 4, FIG. 4 is a schematic structural view of an embodiment of the array substrate 31 as shown in FIG. 3. The array substrate 31 includes multiple (i.e., more than one) pixel units 41, multiple drive circuits 42 and multiple control circuits 43. Each pixel unit 41 is corresponding to one drive circuit 42 and one control circuit 43. FIG. 4 only shows one pixel structure constituted by one pixel unit 41 and the drive circuit 42 and the control circuit 43 corresponding to the pixel unit 41 for the purpose of illustration.

The pixel unit 41 in the layout structure of FIG. 4 includes a first pixel electrode 411 and a second pixel electrode 412. The first pixel electrode 411 and the second pixel electrode 412 are used as a light-transmissive region of the array substrate 31 for achieving the display of image. As shown in FIG. 4, the first pixel electrode 411 and the second pixel electrode 412 both are fishbone shaped electrodes, the first pixel electrode 411 has four domains with different arrangement directions of electrode strip, the second pixel electrode 412 also has four domains with different arrangement directions of electrode strip, so that the whole pixel unit 41 is divided into eight electrode domains, which makes liquid crystal molecules in the liquid crystal layer 33 to have different arrangement directions, the viewing angle can be increased and the color shift at large viewing angle can be improved consequently. It can be understood that, in other embodiment, the first pixel electrode and the second pixel electrode may be other shaped electrodes, for example each are a single piece of strip-shaped electrode.

The drive circuit 42 is electrically connected with the first pixel electrode 411 and the second pixel electrode 412 individually and for inputting a display signal to the first pixel electrode 411 and the second pixel electrode 412. Specifically, the drive circuit 42 includes a first thin film transistor 421, a second thin film transistor 422, a data line 423 and a first scan line 424. The data line 423 extends along the vertical direction and is located between two pixel units 41. The first scan line 424 extends along the horizontal direction. The vertical direction and the horizontal direction are described based on the view of FIG. 4, and may have other expressions based on other view. The first scan line 424 is electrically connected with a gate of the first thin film transistor 421 and a gate of the second thin film transistor 422 individually and for controlling ON-OFF states of the first thin film transistor 421 and the second thin film transistor 422. The data line 423 is electrically connected with a source of the first thin film transistor 421 and a source of the second thin film transistor 422. A drain of the first thin film transistor 421 is electrically connected with the first pixel electrode 411. A drain of the second thin film transistor 422 is electrically connected with the second pixel electrode 412.

The first thin film transistor 421 and the second thin film transistor 422 respectively act as a first switch and a second switch of the drive circuit 42, and in other embodiment, they may be replaced by other type of switches such as Darlington transistors or triodes.

The control circuit 43 is disposed in the vertical projection region 311 of the opaque region 321 and includes a second scan line 431, a third thin film transistor 432 and a capacitor 433. The second scan line 431 is electrically connected with a gate of the third thin film transistor 432 and for controlling ON-OFF states of the third thin film transistor 432. A source of the third thin film transistor 432 is electrically connected with the second pixel electrode, a drain of the third thin film transistor 432 is electrically connected with a terminal of the capacitor 433, and another terminal of the capacitor 433 is electrically connected with a common electrode 44 of the array substrate 31.

The third thin film transistor 432 is used as a third switch of the control circuit 43, and in other embodiment, the third thin film transistor 432 may be replaced by a Darlington transistor or a triode.

In this embodiment, when it is needed to drive the pixel unit 41 to display a corresponding image, the first scan line 424 is inputted with a scan signal to control the first thin film transistor 421 and the second thin film transistor 422 to be ON-states, the data line 423 then inputs a display signal desired for display to the first pixel electrode 411 and the second pixel electrode 412 respectively through the first thin film transistor 421 and the second thin film transistor 422 at the ON-states, and at this time the first pixel electrode 411 and the second pixel electrode 412 have a same potential. Afterwards, the first scan line 424 is stopped being inputted with the scan signal so as to control the first thin film transistor 421 and the second thin film transistor 422 to be OFF-state, and the second scan line 431 is inputted with a scan signal to control the third thin film transistor 432 to be ON-state. Therefore, when the third thin film transistor 432 is controlled to be ON-state, the second pixel electrode 412 is electrically communicated with the capacitor 443 through the third film transistor 432 at the ON-state, so that some of charges on the second pixel electrode 412 flow into the capacitor 433, the potential of the second pixel electrode 412 is changed and the second pixel electrode 412 has a potential difference with respect to the first pixel electrode 411, which is beneficial to improve color shift and thereby low color shift effect of displayed image can be achieved consequently.

In other embodiment, the control circuit 43 may be electrically connected with the first pixel electrode 411 instead and for changing the potential of the first pixel electrode 411. That is, the drain of the third thin film transistor may be electrically connected with the first pixel electrode, so that when the third thin film transistor 432 is controlled to be ON-state, the first pixel electrode 411 and the capacitor 433 are electrically communicated with each other through the third thin film transistor 432 at the ON-state to change the potential of the first pixel electrode 411, and thereby the first pixel electrode 411 and the second pixel electrode 412 are made to have a potential difference therebetween.

The capacitance of the capacitor 433 can be set according to actual requirement for display, so as to control the charge amount flowing into the capacitor 433, and thereby the first pixel electrode 411 and the second pixel electrode 412 can be controlled to have a preset potential difference therebetween.

The capacitor 433 used as a charge sharing capacitor is disposed in the vertical projection region 311 on the array substrate 31 of the opaque region 321. In this embodiment, the first pixel electrode 411 and the second pixel electrode 412 are sequentially arranged along the extending direction (i.e., generally lengthwise direction) of the data line 423, the vertical projection region 311 on the array substrate 31 of the opaque region 321 of the color filter substrate 32 includes the region between the first pixel electrode 411 and the second pixel electrode 412 and the region between two pixel units 41. Compared with the conventional solution of disposing the sharing capacitor in the light-transmissive region of pixel unit, the control circuit 43 and the first scan line 424, the first thin film transistor 421 and the second thin film transistor 422 of the drive circuit 42 all are disposed in the vertical projection region 311 of the opaque region 321, i.e., disposed between the first pixel electrode 411 and the second pixel electrode 412, so that the control circuit 43 including the capacitor 433 and some components of the drive circuit 42 all do not occupy the region where the first pixel electrode 411 and the second pixel electrode 412 are located, i.e., do not occupy the light-transmissive region of the array substrate 31, and accordingly the aperture ratio of panel can be increased.

In the embodiment of the liquid crystal display panel according to the present invention, the capacitor 433 includes a first electrode plate 4331 and a second electrode plate 4332. The first electrode plate 4331 is electrically connected with the drain of the third thin film transistor 432, and the second electrode plate 4332 is electrically connected with the common electrode 44 of the array substrate 31. The metal layer of forming the first electrode plate 4331 and the metal layer of forming the drain of the third thin film transistor 432 are the same one metal layer, i.e., during the photolithography process for forming the third thin film transistor 432, the first electrode plate 4331 and the drain of the third thin film transistor 432 are formed by etching a same metal layer. The second electrode plate 4332 is the metal layer of forming the first scan line 424, that is, the capacitor 433 is formed by the metal layer at which the drain of the third thin film transistor 432 located and the metal layer at which the first scan line 424 located. The positions of the third thin film transistor 432 and the first scan line 424 are corresponding to the position of the black matrix of the color filter substrate 32, i.e., located in the vertical projection region 311 of the opaque region 321. In the prior art, since the common electrode is used as one electrode plate of the sharing capacitor, and the common electrode generally is located in the light-transmissive region of the array substrate, and therefore the sharing capacitor in the prior art occupies some of the light-transmissive region. Compared with the prior art, the embodiment of the present invention uses the first scan line 424 and the metal layer which the drain of the third thin film transistor 432 is located at to form the capacitor 433, the capacitor 433 no longer occupies the light-transmissive region which the first pixel electrode 411 and the second pixel electrode 412 are located at, and the aperture ratio can be increased consequently.

In other embodiment, the capacitor 433 may not use the metal layer of the first scan line 424 for the formation thereof, for example, an additional metal layer is formed in the vertical projection region 311 of the opaque region 321 to from the second electrode plate 4332 of the capacitor 433. In addition, the capacitor 433 can be replaced by other electronic component, such as be replaced by a resistor; and at this case, when the third thin film transistor 432 is controlled to be ON-state, the second pixel electrode 412 and the resistor form a conduction path, some of charges on the second pixel electrode 412 flow through the resistor, the potential of the second pixel electrode 412 is changed, and the second pixel electrode 412 and the first pixel electrode 411 form a potential difference therebetween. As a result, low color shift is achieved.

Figure 5:
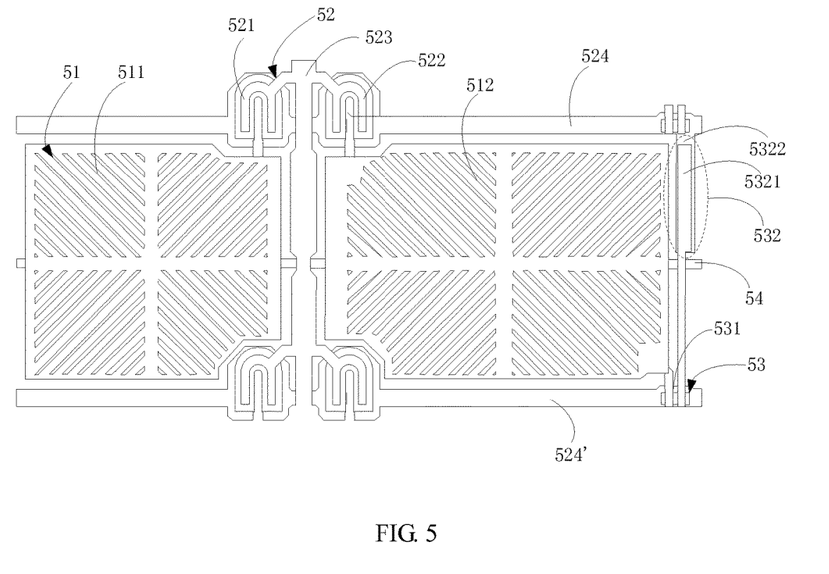
FIG. 5 is a schematic structural view of another embodiment of an array substrate shown in FIG. 3.

Referring to FIG. 5 together with FIG. 3, FIG. 5 is a schematic structural view of another embodiment of the array substrate 31 as shown in FIG. 3. FIG. 5 only shows one pixel structure constituted by one pixel unit 51 and a drive circuit 52 and a control circuit 53 corresponding to the pixel unit 51 for the purpose of illustration. A difference from the above described embodiment is that: the control circuit 53 in this embodiment includes a third thin film transistor 531 and a capacitor 532, and the third thin film transistor 531 corresponding to the pixel unit 51 is electrically connected with the first scan line 524' corresponding to the neighboring next pixel unit.

In addition, in this embodiment, the vertical projection region 311 on the array substrate 31 of the opaque region 321 of the color filter substrate 32 includes the region between two pixel units 51 and the region between the first pixel electrode 511 and the second pixel electrode 512 of one pixel unit 51. The first pixel electrode 511 and the second pixel electrode 512 are sequentially arranged along the extending direction (i.e., generally lengthwise direction) of the first scan line 524. The first thin film transistor 521, the second thin film transistor 522 and the first scan line 524 of the drive circuit 52 are located in the vertical projection region 311 of the opaque region 321 and between neighboring two pixel units sequentially arranged along the vertical direction. The data line 523 is located in the vertical projection region 311 of the opaque region 321 and between the first pixel electrode 511 and the second pixel electrode 512. The third thin film transistor 531 and the capacitor 532 are located in the vertical projection region 311 of the opaque region 321 and between neighboring two pixel units sequentially arranged along the horizontal direction.

In the drive circuit 52 corresponding to the illustrated pixel unit 51, the first scan line 524 is electrically connected with a gate of the first thin film transistor 521 and a gate of the second thin film transistor 522 individually and for controlling ON-OFF states of the first thin film transistor 521 and the second thin film transistor 522. The data line 523 is electrically connected with a source of the first thin film transistor 521 and a source of the second thin film transistor 522 individually. A drain of the first thin film transistor 521 is electrically connected with the first pixel electrode 511. A drain of the second thin film transistor 522 is electrically connected with the second pixel electrode 512. In the control circuit 53 corresponding to the illustrated pixel unit 51, a gate of the third thin film transistor 531 is electrically connected with the first scan line 524' corresponding to the neighboring next pixel unit. The neighboring next pixel unit is a next pixel unit sequentially arranged with the illustrated pixel unit 51 along the vertical direction and neighboring with the illustrated pixel unit 51. The source of the third thin film transistor 531 is electrically connected with the second pixel electrode 512, the drain of the third thin film transistor 531 is electrically connected with a terminal of the capacitor 532, and another terminal of the capacitor 532 is electrically connected with a common electrode 54 of the array substrate 31.

After a display signal desired for display is inputted to the first pixel electrode 511 and the second pixel electrode 512 under the cooperation of the first scan line 524 corresponding to the illustrated pixel unit 51 and the data line 523, the first scan line 524 corresponding to the illustrated pixel unit 51 is stopped being inputted with scan signal, the first scan line 524' corresponding to the neighboring next pixel unit is inputted with a scan signal, so that the third thin film transistor 531 corresponding to the illustrated pixel unit 51 is controlled to be ON-state, some of charges on the second pixel electrode 512 flows into the capacitor 532, so that the second pixel electrode 512 and the first pixel electrode 511 are made to have a potential difference (voltage difference) therebetween, and the effect of reducing color shift can be achieved consequently. In addition, by using the next first scan line to control the third thin film transistor of the previous row, the amount/number of scan line and the cost can be reduced while the aperture ratio can be further increased.

The first electrode plate 5321 of the capacitor 532 and the drain of the third thin film transistor 531 are formed by a same one metal layer, the second electrode plate 5322 of the capacitor 532 and the first scan line 524 corresponding to the illustrated pixel unit 51 are formed by a same one metal layer, and therefore the capacitor 532 is formed in the vertical projection region 311 of the opaque region 321, the aperture ration can be increased consequently.

The present invention further provides an embodiment of an array substrate, and the array substrate is the array substrate of any one of above described embodiments.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An array substrate comprising a pixel unit, and a drive circuit and a control circuit corresponding to the pixel unit; the pixel unit comprising a first pixel electrode and a second pixel electrode; wherein
the drive circuit is electrically connected with the first pixel electrode and the second pixel electrode and for inputting a display signal to the first pixel electrode and the second pixel electrode, the control circuit is electrically connected with one of the first pixel electrode and the second pixel electrode and for controlling the first pixel electrode and the second pixel electrode to have a preset voltage difference therebetween;
the drive circuit comprises a first switch, a second switch, a data line and a first scan line, the first switch and the second switch being electrically with the first pixel electrode and the second pixel electrode respectively, the data line and the first scan line each being electrically connected with the first switch and the second switch;
the control circuit comprises a third switch and a charge discharging element, the charging discharging element being electrically connected with the second pixel electrode by the third switch;
the first switch, the second switch, and the first scan line all are located in a vertical projection region on the array substrate of a first opaque region of a counter substrate of the array substrate and without occupy regions where the first pixel electrode and the second pixel electrode are located, the control circuit is located in the vertical projection region on the array substrate of a second opaque region of the counter substrate of the array substrate and without occupy regions where the first pixel electrode and the second pixel electrode are located, the first and the second opaque regions are regions where a black matrixes are located, the first pixel electrode and the second pixel electrode being used as a light-transmissive region of the array substrate; and
the first opaque region and the second opaque region are not overlapped.

2. The array substrate according to claim 1, wherein the first scan line is configured for controlling ON-OFF states of the first switch and the second switch, and when the first switch and the second switch are controlled to be ON-states, the data line is configured for inputting the display signal to the first pixel electrode and the second pixel electrode through the first switch and the second switch at the ON-states respectively.

3. The array substrate according to claim 1, wherein the first switch, the second switch and the third switch all are thin film transistors, the charge discharging element is a charge sharing capacitor, and the charge sharing capacitor comprises a first electrode plate and a second electrode plate, a metal layer of forming the first electrode plate and a metal layer of forming a drain of the third switch are the same one metal layer, the second electrode plate is a metal layer of forming the first scan line.

4. The array substrate according to claim 1, wherein the data line is located in a vertical projection region on the array substrate of a third opaque region of the counter substrate of the array substrate and without occupy regions where the first pixel electrode and the second pixel electrode are located; and
the third opaque region and the second opaque region are not overlapped.

5. The array substrate according to claim 4, wherein the third opaque region is located between the first pixel electrode and the second pixel electrode.

6. The array substrate according to claim 1, wherein the charge discharging element is a charge sharing capacitor, the third switch is electrically connected with another first scan line of a drive circuit corresponding to a neighboring next pixel unit and thereby ON-OFF states of the third switch are subjected to the control of the first scan line of the drive circuit corresponding to the neighboring next pixel unit, the charge sharing capacitor is electrically connected with the second pixel electrode through the third switch and for changing a voltage on the second pixel electrode when the third switch is controlled to be ON-state and thereby making the first pixel electrode and the second pixel electrode to have the preset voltage difference therebetween; and the second opaque region is located on between the pixel unit and the neighboring next pixel unit.

7. The array substrate according to claim 1, wherein the first pixel electrode and the second pixel electrode are sequentially arranged along the lengthwise direction of the first scan line, the control circuit and the first switch, the second switch and the first scan line of the drive circuit are disposed between neighboring two pixel units.

8. The array substrate according to claim 1, wherein the charge discharging element is a resistor or a Darlington transistor.

9. A liquid crystal display panel comprising an array substrate, a color filter substrate and a liquid crystal layer disposed between the array substrate and the color filter substrate; the color filter substrate comprising an opaque region; the array substrate comprising a pixel unit, and a drive circuit and a control circuit corresponding to the pixel unit; the pixel unit comprising a first pixel electrode and a second pixel electrode; wherein the drive circuit is electrically connected with the first pixel electrode and the second pixel electrode and for inputting a display signal to the first pixel electrode and the second pixel electrode, the control circuit is electrically connected with one of the first pixel electrode and the second pixel electrode and for controlling the first pixel electrode and the second pixel electrode to have a preset voltage difference therebetween;

the drive circuit comprises a first switch, a second switch, a data line and a first scan line, the first switch and the second switch being electrically with the first pixel electrode and the second pixel electrode respectively, the data line and the first scan line each being electrically connected with the first switch and the second switch;

the control circuit comprises a third switch and a charge discharging element, the charging discharging element being electrically connected with the second pixel electrode by the third switch;

the first switch, the second switch, and the first scan line all are located in a vertical projection region on the array substrate of a first opaque region of a counter substrate of the array substrate and without occupy regions where the first pixel electrode and the second pixel electrode are located, the control circuit is located in the vertical projection region on the array substrate of a second opaque region of the counter substrate of the array substrate and without occupy regions where the first pixel electrode and the second pixel electrode are located, the first and the second opaque regions are regions where a black matrixes are located, the first pixel electrode and the second pixel electrode being used as a light-transmissive region of the array substrate; and the first opaque region and the second opaque region are not overlapped.

10. The liquid crystal display panel according to claim 9, wherein
the first scan line is configured for controlling ON-OFF states of the first switch and the second switch, and when the first switch and the second switch are controlled to be ON-states, the data line is configured for inputting the display signal to the first pixel electrode and the second pixel electrode through the first switch and the second switch at the ON-states respectively.

11. The liquid crystal display panel according to claim 9, wherein
the first switch, the second switch and the third switch all are thin film transistors, the charge discharging element is a charge sharing capacitor, and the charge sharing capacitor comprises a first electrode plate and a second electrode plate, a metal layer of forming the first electrode plate and a metal layer of forming a drain of the third switch are the same one metal layer, the second electrode plate is a metal layer of forming the first scan line.

12. The liquid crystal display panel according to claim 9, wherein
the data line is located in a vertical projection region on the array substrate of a third opaque region of the counter substrate of the array substrate and without occupy regions where the first pixel electrode and the second pixel electrode are located; and
the third opaque region and the second opaque region are not overlapped.

13. The liquid crystal display panel according to claim 12, wherein the third opaque region is located between the first pixel electrode and the second pixel electrode.

14. The liquid crystal display panel according to claim 9, wherein
the charge discharging element is a charge sharing capacitor, the third switch is electrically connected with another first scan line of a drive circuit corresponding to a neighboring next pixel unit and thereby ON-OFF states of the third switch are subjected to the control of the first scan line of the drive circuit corresponding to the neighboring next pixel unit, the charge sharing capacitor is electrically connected with the second pixel electrode through the third switch and for changing a voltage on the second pixel electrode when the third switch is controlled to be ON-state and thereby making the first pixel electrode and the second pixel electrode to have the preset voltage difference therebetween; and
the second opaque region is located on between the pixel unit and the neighboring next pixel unit.

15. The liquid crystal display panel according to claim 9, wherein
the first pixel electrode and the second pixel electrode are sequentially arranged along the lengthwise direction of the first scan line, the control circuit and the first switch, the second switch and the first scan line of the drive circuit are disposed between neighboring two pixel units.

16. The liquid crystal display panel according to claim 9, wherein the charge discharging element is a resistor or a Darlington transistor.

* * * * *